P. GLADBACK.
RAKE.
APPLICATION FILED FEB. 26, 1909.
957,947.
Patented May 17, 1910.
3 SHEETS—SHEET 2.
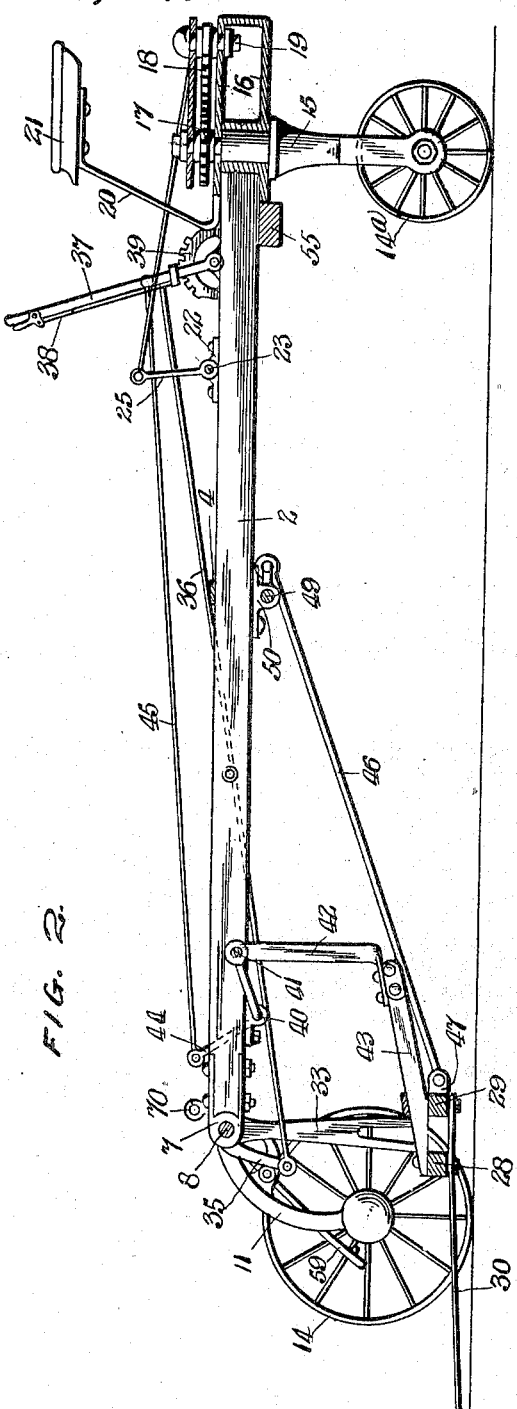
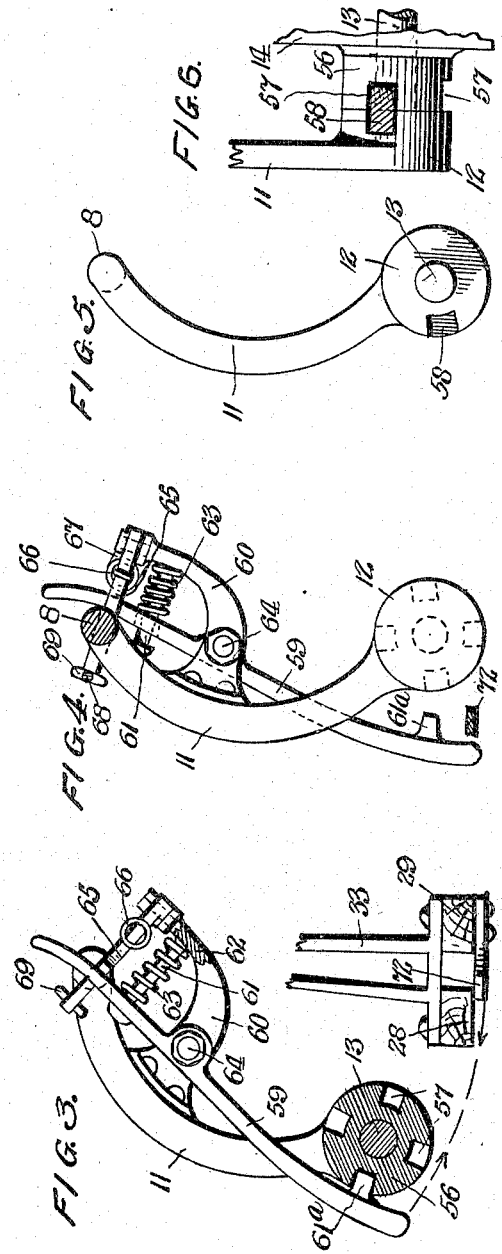
WITNESSES
C. K. Davis
Myron J. Clear
Peter Gladback,
INVENTOR
C. L. Parker.
Attorney

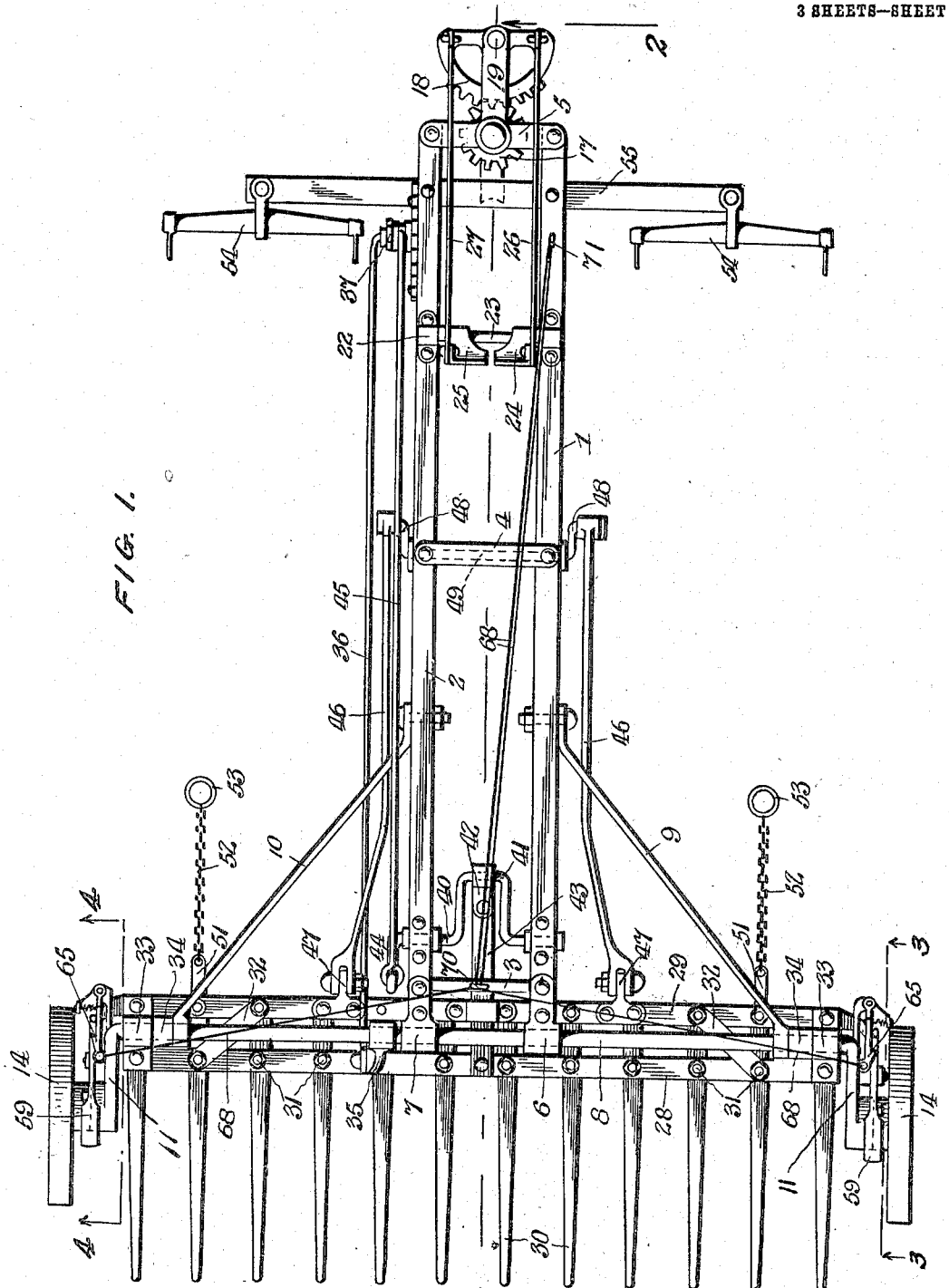

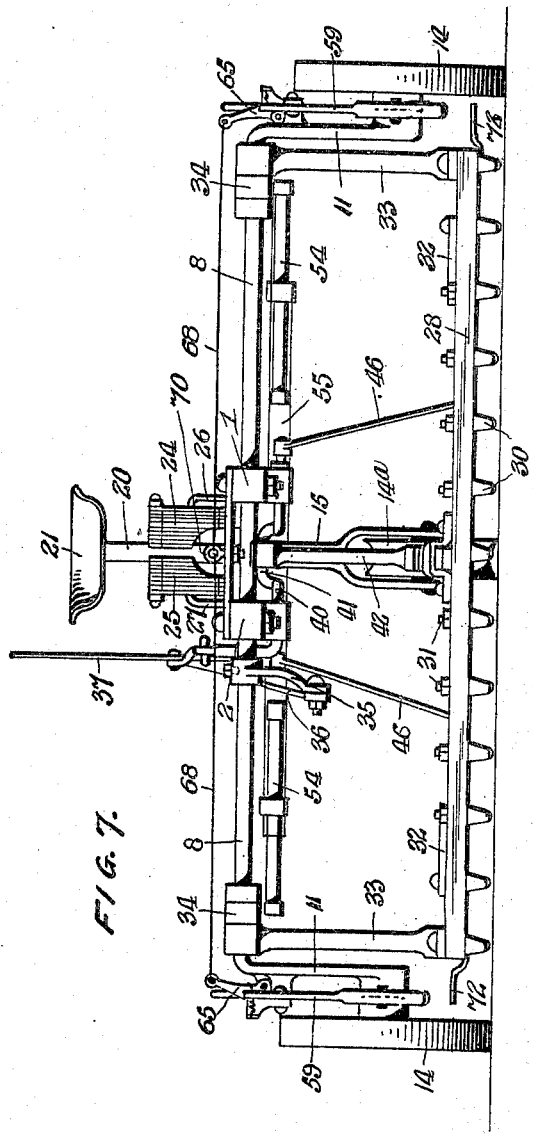

UNITED STATES PATENT OFFICE.

PETER GLADBACK, OF MENDON, MISSOURI.

RAKE.

957,947.

Specification of Letters Patent. Patented May 17, 1910.

Application filed February 26, 1909. Serial No. 480,230.

*To all whom it may concern:*

Be it known that I, PETER GLADBACK, citizen of the United States, residing at Mendon, in the county of Charlton and State of Missouri, have invented certain new and useful Improvements in Rakes, of which the following is a specification.

My invention relates to rakes, and more particularly to horse rakes, and the object thereof is to provide a novel structure which will be highly efficient in its operation.

A further object is to provide a structure in which the rake frame may be raised and lowered by the operator, and the rake frame simultaneously inclined at an angle away from the ground in the upper position, and toward the ground in the lower position, with respect to its direction of movement.

A still further object is to provide means in addition to the above whereby the rake frame may be tripped and automatically caused to raise while the rake is in movement.

Further objects of, and the advantages derived from, my present invention, will be readily apparent to those skilled in the art, from the following description in which reference is made to the accompanying drawing forming a part of the specification, and in which, Figure 1 is a plan view of my improved rake. Fig. 2 is a central longitudinal sectional view therethrough on the line 2—2 of Fig. 1. Fig. 3 is a detail transverse sectional view taken through a portion thereof on line 3—3 of Fig. 1, and on an enlarged scale. Fig. 4 is a similar view taken on line 4—4 of Fig. 1. Fig. 5 is an end view of the oscillatory supporting shaft. Fig. 6 is a detail elevation of the lower portion of one of the shaft extensions, and a portion of a wheel mounted on its trunnion, and broken away. Fig. 7 is a front elevation of the entire rake. Fig. 8 is an enlarged detail plan view of one end of the supporting shaft and rake frame, and the traction wheel and interlocking mechanism, and, Fig. 9 is a perspective view of one end of the supporting shaft.

In carrying out my invention, I provide a body frame comprising parallel longitudinal beams 1 and 2, which are connected at their forward and rear ends, and at an intermediate point, by transverse braces 3, 4 and 5, and have upon their forward ends, rigid straps 6 and 7 respectively, through which extends the transverse shaft 8. Diagonal brace rods 9 and 10, secured to and extending from the frame beams 1 and 2 respectively, at a point forwardly of their transverse brace 4, and provided with apertured forward ends surrounding the shaft 8, adjacent its outer end, serve to brace said shaft, and permit of its rotation. The shaft 8 is provided upon each end thereof, with downturned and forwardly curved extensions 11, having circular hubs 12 at their lower ends, from which extend lateral trunnions 13, forming shafts for the wheel 14 loosely rotatively mounted thereon.

The rear portion of the body frame is supported by a wheel 14ª mounted within the forks of a caster 15, the upper end of which is rotatably mounted through the rear transverse brace bar 5 of beams 1 and 2 and through a supplemental frame 16 secured to said bar 5, the upper extremity of said caster being provided with a gear wheel 17, intermeshing with teeth of a segment 18, rotatively supported upon a vertical shaft 19 in said frame 16.

The brace bar 5 supports the seat bar 20, having the seat 21 mounted upon the upper end thereof, substantially in line above wheel 14, as shown in Fig. 2. Forwardly of the seat bar and secured transversely of beams 1 and 2, with brackets 22, is a stationary shaft 23, upon which the lower apertured ends of foot pieces 24 and 25 are loosely mounted. Said foot pieces 24 and 25 are respectively connected, by means of rods 26 and 27, to diametrically opposite points of the segment 18, whereby the forward movement of one of said foot pieces causes rotation of said segment in one direction, and forward movement of the other foot piece causes rotation of said segment in the opposite direction, such rotation being communicated through gear 17 and caster 15 to wheel 14, to guide the machine.

The rake frame proper comprises parallel beams 28 and 29, to the under surfaces of which are connected the rake teeth 30, extending transversely forwardly therefrom, by bolts 31, extending upwardly through said beams 28 and 29, said beams being further supported by diagonal brace bars 32, and being suspended from the shaft 8 by hangers 33, the lower ends of which are secured to said beams 28 and 29, the upper ends of which are apertured to surround the said shaft 8 in loose rotatable relation, said hangers being spaced from the forward ends of the brace bars 9 and 10 by sleeves 34 surrounding the shaft 8.

From the foregoing it will be seen that it is simply necessary to oscillate the shaft 8 in order to move wheels 14 rearwardly, and thereby raise the forward ends of beams 1 and 2, through which shaft 8 is journaled, and to raise the rake frame proper to the upper position. This movement is accomplished by means of a forwardly inclined downwardly extending arm 35, which is rigidly secured at its upper end, about shaft 8 to one side of the end strap 7 of frame beam 2, which arm 35 has pivotal connection at its lower end with a connecting rod 36, extending rearwardly therefrom, and pivotally secured at its rear end, to a controlling lever 37, pivotally mounted upon the frame beam 2 adjacent its rear end, and provided with a suitable latch mechanism 38 in engagement with a notch quadrant 39, also secured upon said beam 2. Thus by rearward movement of lever 37, the shaft 8 is rotated in a direction to move the wheel 14 rearwardly, and raise the rake frame proper, while upon forward movement of said lever 37, rotation of said shaft 8 is accomplished in the opposite direction to lower the rake frame.

Extending transversely between the frame beams 1 and 2, and journaled therethrough adjacent their forward ends, is a shaft 40, provided with a central crank portion 41 between said beams, about which crank portion 41 is loosely journaled, the upper end of an arm 42 extending upwardly from the rear end of a beam 43 projecting rearwardly from a central point of the rake frame proper, and secured at its forward end thereto. The shaft 40 extends through the frame beam 2, and is provided with an upwardly projecting angular arm 44, to the upper end of which is pivotally secured the forward end of a connecting rod 45, which is pivotally secured at its rear end to the controlling lever 37, whereby to simultaneously rotate the rake frame upon shaft 8, as the shaft is rotated to raise and lower the rake frame in accordance with the foregoing description. This movement results in a depression of arm 42, when the adjusting lever 37 is moved rearwardly, forcing the rake teeth 30 at an angle forwardly and upwardly with relation to the ground, as the said frame is raised by the rotation of shaft 8, the reverse movement of lever 37, inclining said teeth downwardly toward the ground as the rake frame is lowered. The rake frame proper is additionally supported in its aforementioned movement, by supporting connecting bars 46, one at each side of the frame beams 1 and 2, which bars are pivotally connected at their forward ends, to members 47 extending rearwardly from the rear rake frame beam 29, and are journaled at their forward ends upon the crank extremities 48, of a shaft 49 journaled transversely through brackets 50 secured upon the under surfaces of the beams 1 and 2. The rake frame proper is further provided with rearwardly projecting apertured members 51, extending therefrom adjacent each end thereof, and provided with chains 52 secured thereto and terminating in rings 53. These chains 52 and rings 53 are located upon each side of the frame beams 1 and 2, as shown in Fig. 1 and between the said rings and the swingle trees 54 secured to the ends of a draft beam 55 mounted transversely of beams 1 and 2 adjacent their rear ends, are adapted to be secured the draft animals for drawing the machine.

In carrying out the further idea with respect to raising and lowering of the rake frame proper, I provide the wheels 14 which are mounted upon the trunnions 13, with hub portions 56, which oppose the hub portions 12 of the angular shaft ends 11, and are provided with a plurality of cut out portions 57, any one of which is adapted to register with a single cut out portion 58 in the hub portion 12 of the shaft ends 11, for the reception of a member which locks hub portions 12 and 56, together, and consequently prevents rotation of wheels 14. To accomplish this, I provide a lever 59 pivotally mounted upon a bracket 60 extending rearwardly from the shaft end 11, as will be seen by reference to Figs. 3 and 4, which lever 59 is provided upon its lower end with a projecting pin 61$^a$ adapted to enter the cut out portion 58 of hub portion 12, and one of the cut out portions 57 of hub portions 56, when the same are registered, and of a sufficient width to span the adjoining portion of said hub portion in order to lock the same together. Above its pivot, lever 59 is provided with a transverse opening through which projects a pin 61, extending from an offset portion 62 of bracket 60, upon which pin 61, and between said portion 62 and the said lever 59, is arranged spiral springs 63, which tend to press the upper portion of said lever above its pivot 64 forwardly, throwing the lower end and the pin 61 thereof against the hub portions 12 and 56. Upon its extreme end, beyond the pin 61, the bracket 60 is provided with a reduced end upon which is journaled one end of a latch piece 65, adapted for engagement over the upper end of lever 59, between the same in the inoperative position shown in Fig. 4. A coil spring 66 extending between latch member 65 and an extension portion 67 of the bracket offset 62, serves to draw said latch member toward said lever 59.

It will be understood that the mechanism just described for locking hub portions 12 and 56 is provided in connection with each of the angular shaft ends 11. To this end trip cords 68 are secured to rings 69 at the ends of the latch members 65, and are passed rearwardly through an eye 70 formed upon the forward transverse frame brace 3, and rearwardly through said eye 70, through a stationary piece 71, upon frame beam 1, adjacent its rear end, in order that the said trip cords may be within convenient reach of the operator.

The operation of the aforementioned wheel-locking mechanism is as follows: With the rake frame proper in its lowered position, the lever 59 is maintained in its inactive position by the engagement of latch members 65 therewith. As the latches 65 are released against the tension of their springs 66, by pulling the trip cords 68, the levers 59 are oscillated upon their pivots 64, by springs 63, throwing their lower ends provided with pin 61ª, toward and against the hubs 12 and 56, and in line with cut out portions 58 of hub 12. Thus as wheels 14 continue to revolve, it is a matter of but a short space, until one of the cut out portions 57 of the hubs 56 thereof, will aline with the cut out portion 58 of hub 12, and thus permit the entrance of pin 61ª into the alined cut out portions, when wheels 14 will be locked and the momentum of the machine will force shaft 8 to oscillate forwardly, and thus raise the rake. When the trip cords 68 are pulled, the latch mechanisms 38 of lever 37 must be released, as, during the raising of the rake frame automatically, as just described, lever 37 is of course, moved rearwardly. Lever 37 is however, moved only partially to its rearward extent, and to this end, the rake frame beams 28 and 29 have connected to the ends thereof, and extending outwardly, arms 72, which upon the forward upward swinging movement of said rake frame by the continued rearward movement of lever 37 by the operator after the rake frame has been automatically raised, engage the lower end of the locking lever 59, and force the same forwardly, thereby forcing the upper ends above their pivot 64, rearwardly until the latches 65 under tension of the springs 66 again engage the upper end of said lever.

Having fully described my invention, I claim:

1. In a rake of the character described, the combination of a wheeled frame, an oscillatory shaft journaled therein, wheels carried by said shaft, a rake frame, carrying rake teeth, suspended from, and rotatably connected to, said shaft, means to oscillate said shaft and raise and lower said shaft and rake frame, and means for simultaneously swinging said rake frame upon the said shaft to cause the same to assume inclined positions toward and away from the ground in the lower and upper positions thereof, respectively, substantially as described.

2. In a rake of the character described, the combination of a frame, provided at its rear end with a guiding wheel, an oscillatory shaft journaled transversely of, and at the forward end, of said frame, wheels loosely rotatively carried by said shaft, a rake frame carrying forwardly projecting rake teeth, suspended from, and rotatably connected to, said shaft, means to oscillate said shaft and raise and lower said shaft and rake frame, and means for simultaneously swinging said rake frame upon said shaft to cause the same to assume inclined positions toward and away from the ground in the lower and upper positions thereof, respectively, substantially as described.

3. A rake of the character described, comprising a body frame, a shaft pivotally connected to said body frame and provided with angular ends, wheels rotatably mounted upon said angular ends, means for locking said wheels and said angular ends together, a rake-teeth-carrying member pivotally connected to said body frame, and means for moving said rake-teeth-carrying member.

4. A rake of the character described, comprising a body frame, members swingingly mounted upon said body frame, wheels rotatably mounted upon said members, manually operative means for swinging said members, and a rake-teeth-carrying member connected to said body frame.

5. A rake of the character described, comprising a supporting frame, a shaft rotatably mounted upon said supporting frame and provided with angular ends, wheels rotatably mounted upon said angular ends, means for locking said wheels and said angular ends together, a rake-teeth-carrying member swingingly mounted upon said frame, and common means for simultaneously moving said angular ends and said rake-teeth-carrying member.

6. A rake of the character described, comprising a body frame, a shaft pivotally connected to said body frame and provided with angular ends, wheels rotatably mounted upon said angular ends, means for locking said wheels and said angular ends together, and a rake-teeth-carrying member pivotally connected to said shaft.

7. A rake of the character described, comprising a body frame, a shaft pivotally connected to said body frame and provided with angular ends, wheels rotatably mounted upon said angular ends, means for locking said wheels and said angular ends together, a lever rigidly connected to said shaft, an operating lever mounted upon said body frame and having connection with said first named lever, a teeth-carrying member pivotally connected to said shaft, and connecting means between said rake-teeth-carrying member and said operating lever.

8. A rake of the character described, comprising a body frame, a shaft pivotally connected to said body frame and provided with angular ends, wheels rotatably mounted upon said angular ends, each of said angular ends and its wheel mounted thereon being provided with portions having recesses formed thereon adapted to move into registration with each other, a swinging arm mounted near the wheel and provided with a projection adapted to fit within said recesses when the same are in registration with each other, and a rake-teeth-carrying member connected to said shaft.

9. A device of the character described, comprising a body frame, a shaft pivotally connected to said body frame and provided with angular ends, wheels rotatably mounted upon said angular ends, means for locking said wheels to said angular ends, releasable means for normally holding said locking means out of engagement with said wheels and angular ends, and a rake-teeth-carrying member pivotally connected to said shaft.

In testimony whereof I affix my signature in presence of two witnesses.

PETER GLADBACK.

Witnesses:
W. H. WARD,
F. M. STEWART.